Feb. 15, 1955  B. EVANOFF  2,701,975
CHAIN SAW SHARPENER
Filed March 12, 1954  2 Sheets-Sheet 1
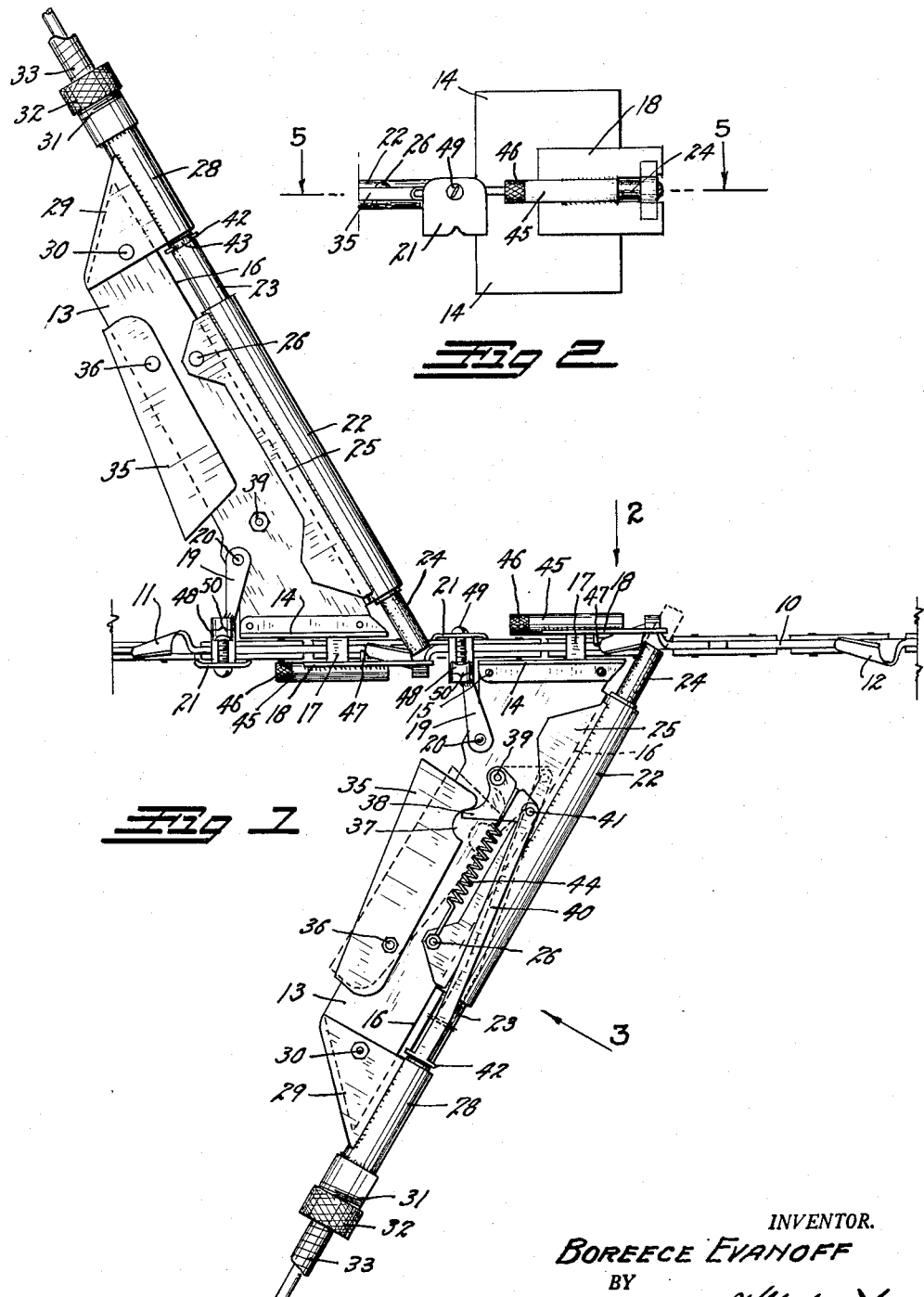
INVENTOR.
BOREECE EVANOFF
BY
ATTORNEY

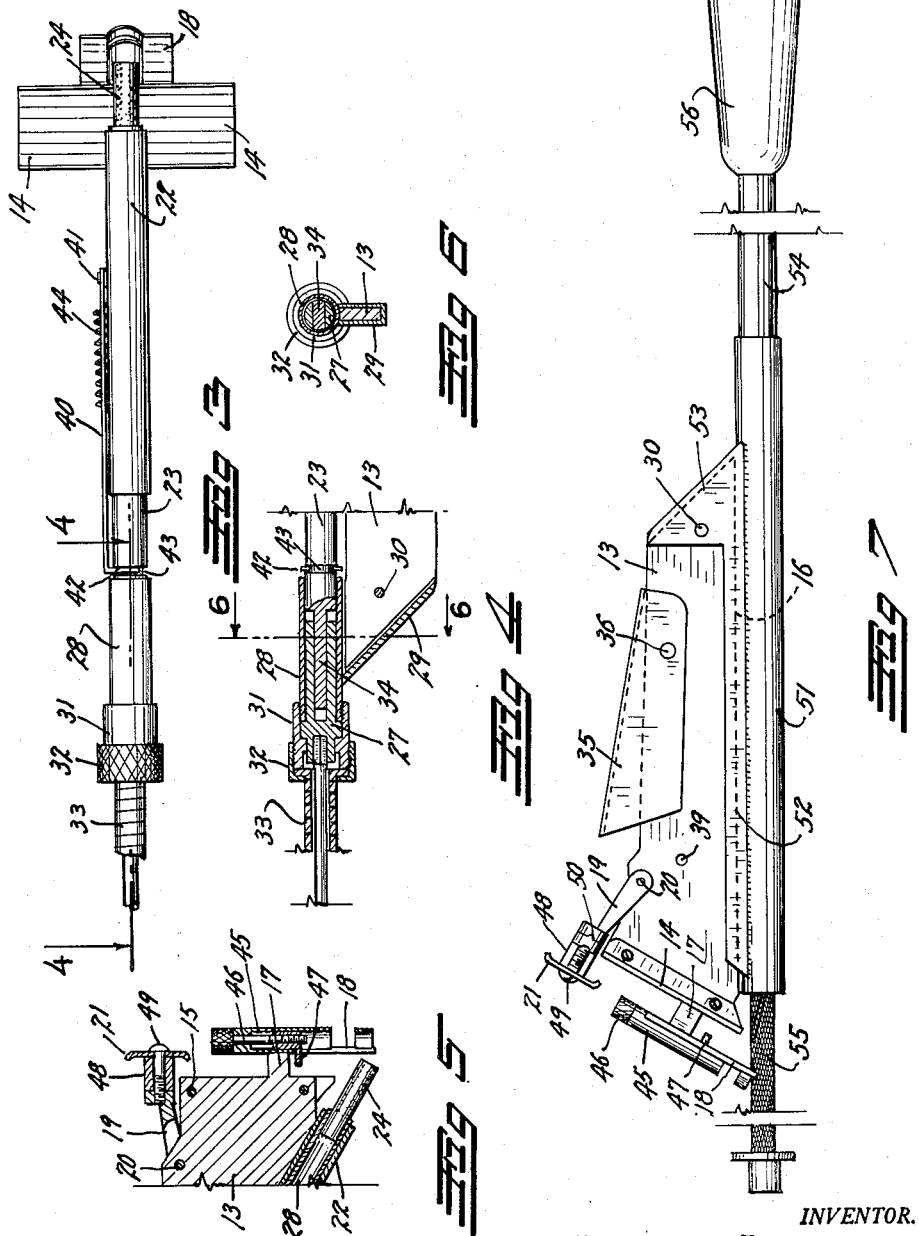

2,701,975

CHAIN SAW SHARPENER

Boreece Evanoff, Oak Creek, Colo.

Application March 12, 1954, Serial No. 415,800

4 Claims. (Cl. 76—37)

This invention relates to a chain saw sharpening device, and has for its principal object the provision of a simple and highly efficient tool for quickly, easily and accurately sharpening the cutting teeth of a conventional chain saw.

Another object of the invention is to provide a chain saw sharpening device employing a rotary abrasive file for sharpening the hooked cutting edges of a chain saw which can be held in the hand and in which the cutting pressure of the file can be regulated by varying the gripping pressure of the hand.

A further object is to so construct the device that the rotating file can be caused to travel back and forth across the tooth by simply tightening and loosening the grip of the hand so that the abrasive file will be worn down uniformly and so that a perfect grind will be obtained on the teeth.

A still further object is to provide a chain saw sharpener which can be used either for power sharpening or for hand sharpening.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of a portion of a conventional chain saw, illustrating the invention in place thereon in two different positions, one position illustrating the sharpening of the left-hand teeth and one position illustrating the sharpening of the right-hand teeth of the saw;

Fig. 2 is an end view of the improved sharpener looking in the direction of the arrow 2, Fig. 1;

Fig. 3 is an edge view thereof looking in the direction of the arrow 3, Fig. 1;

Fig. 4 is a detail section, taken on the line 4—4, Fig. 3;

Fig. 5 is a detail section, taken on the line 5—5, Fig. 2;

Fig. 6 is a detail section, taken on the line 6—6, Fig. 4; and

Fig. 7 is a detail view, illustrating a hand sharpening attachment which may be used with the improved chain saw sharpener.

In the drawing, a conventional chain saw is indicated at 10, with its left-hand cutting teeth at 11 and right-hand cutting teeth at 12.

The improved sharpener is constructed about a relatively flat frame plate 13 having a contour as illustrated in the drawing and terminating at its forward extremity in upwardly and downwardly extending flange plates 14. The flange plates are secured on the top and bottom faces of the forward extremity of the frame plate 13 in any desired manner, such as by means of suitable screws 15, so that the plane of the flange plates 14 is substantially at right angles to the plane of the frame plate 13. A spacing tongue 17 extends forwardly from the forward extremity of the frame plate 13 between the flange plates 14 and supports a backing plate 18 in spaced, parallel relation to the flange plates 14. One side edge 16 of the frame plate 13 is straight and is inclined at an angle of substantially 30° to the plane of the flange plates 14. A movable bracket member 19 is hingedly mounted on a pivot pin 20 in the frame plate 13 adjacent the side opposite the straight edge 16. The bracket member 19 extends forwardly from the frame plate 13 and terminates at its extremity in an aligning plate 21 which is positioned in substantial alignment with the backing plate 18.

The aligning plate 21 is adjustable on the bracket 19. The adjustment is accomplished by means of a rotatable spacer 48 secured on the extremity of the bracket 19 by means of an attachment screw 49. The spacer 48 is provided with two oppositely positioned locating tenons 50 receivable in oppositely positioned notches in the bracket 19 so that by loosening the screw 49, the plate 21 can be rotated to an upwardly or downwardly projecting position.

The inclined straight edge 16 is designed to receive a shaft sleeve 22 in which a rotatable abrasive shaft 23 is carried. The extremity of the abrasive shaft terminates in an abrasive rod 24 with which the saw teeth are sharpened. The sleeve 22 is provided with two parallel, spaced-apart, longitudinally extending fins 25 which slide over the upper and lower faces of the frame plate 13 and maintain the sleeve 22 in accurate alignment with the edge 16. The sleeve is secured on the frame plate adjacent its rear extremity by means of a removable attachment pin 26 extending through the two fins 25 and through the frame plate 13.

The extremity of the shaft 23 is flattened, as shown at 34, and extends into a longitudinal notch formed in the extremity of a shaft stud 27. The shaft stub is rotatably mounted in a cylindrical collar 28 having a hollow triangular bracket 29 into which the extremity of the frame plate 13 is secured by means of a suitable attachment screw 30. The collar 28 terminates in a threaded extremity 31 designed to receive a conventional coupling 32 on the extremity of a conventional flexible shaft 33. The flexible shaft is connected into the shaft stub 27 as is usual with flexible shaft connections. The shaft 23 can be reciprocated longitudinally in the sleeve 22 and when so reciprocated the flattened extremity 34 slides longitudinally in the slot in the extremity of the shaft stub 27.

Longitudinal reciprocation is imparted to the shaft 23 from a pivoted hand grip 35. The hand grip 35 is channel-shaped in cross-section and fits snugly over the edge of the frame plate 13, opposite the inclined straight edge 16, and is hingedly secured in place thereon upon a suitable hinge bolt 36.

On the upper face of the frame plate 13, the hand grip 35 is provided with an arcuate cam notch 37 into which the extremity of a pivoted cam plate 38 extends. The cam plate is pivoted on the frame plate 13 by means of a suitable pivot pin or rivet 39. A connecting bar 40 extends, from a hinge pin 41 on the cam plate 38, to a downwardly-turned, bifurcated yoke 42 formed on the bar 40. The yoke 42 engages in a circumferential groove 43 in the shaft 23 to transfer the longitudinal movements of the connecting bar 40 into longitudinal movements of the shaft 23.

A tension spring 44 is connected between the pins 26 and hinge pin 41 to constantly tend to swing the cam plate 38 in one direction. The cam plate may be manually swung in the opposite direction by squeezing the hand grip 35 in the hand, so as to cause the cam notch 37 to engage the cam 38 and rotate the latter against the action of the spring 44, as shown in broken line in Fig. 1. Thus, while the abrasive rod 24 is rotating, it can be simultaneously longitudinally reciprocated by alternately squeezing and releasing the hand grip 35.

A gauge screw tube 45 is mounted on the backing plate 18 and carries a rotatable gauge screw 46. The extremity of the gauge screw 46 is threaded through a movable, projecting gauge member 47 positioned to engage the back of the saw tooth being sharpened.

To sharpen the teeth of the chain saw, the spacing tongue 17 and the spacer 48 are laid on the saw in a position to bring the abrasive rod 24 forwardly of the cutting edge of a left-hand tooth 11. This positions the lower flange plate 14 against the near side of the saw and positions the aligning plate 21 and the backing plate 18 on the far side of the saw. The tongue 17 and the spacer 48 support the sharpener on the saw and the aligning plate also maintains the abrasive rod 24 at the correct cutting angle. The hand grip 35 and the sleeve 22 are now gripped in the hand to bring the abrasive rod 24 against the forward edge of the tooth to be sharpened. The gauge screw 46 is now adjusted to space the gauge member 47 away from the back of the tooth a distance equal to the amount of metal it is desired to remove from the tooth.

The motor connected to the flexible shaft 33 is started and the operator grips the hand grip 35 and the sleeve 22 to bring the rotating abrasive rod 24 against the cutting edge of the tooth, constantly relaxing and gripping the hand to shift the abrasive shaft 23 and the abrasive rod 24 back and forth transversely of the tooth as the metal is removed. Eventually, a point will be reached, determined by the setting of the gauge member 47, when no further metal will be removed. The entire sharpening device is then lifted from the saw and lowered in position ahead of the next left-hand tooth and the operation is repeated. This is continued until all of the left-hand saw teeth have been sharpened.

The entire sharpening device is now inverted and placed on the opposite side of the saw as shown in the upper position of Fig. 1 and the process is repeated with all of the right-hand teeth thereon.

It is desired to call attention to the fact that the alternate tightening and relaxing of the hand grip serves a double purpose. First, it intermittently presses the sleeve 22 inwardly to bring the abrasive against the teeth, and second, it swings the grip 35 to shift the rotating abrasive rod 24 across the teeth.

As above described, the invention is used with a motor or other device to rotate the abrasive shaft 23. Should motive power not be available, the pin 26 and the screw 30 can be removed so that the sleeve 22 and the collar 28 can be detached from the frame plate 13. They are then replaced by a file guide tube 51, as illustrated in Fig. 5. This tube also has aligning fins 52, similar to the aligning fins 25 previously described, and a hollow bracket 53, similar to the bracket 29 previously described, by means of which it is slipped into place on the frame plate 13 and attached by means of the attachment screw 30.

The tube 51 is designed to hold a rod-like file shank 54 into one extremity of which a rat-tail file 55 is insertable. The other extremity is provided with a suitable handle 56.

It can be seen that the tube can be gripped to the frame plate 13 similarly to the former sleeve 22 so as to bring the file into contact with the teeth, similarly to the abrasive rod 24, so that by gripping the frame plate in one hand and reciprocating the handle in the other, the saw teeth may be accurately and rapidly sharpened by hand.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A chain saw sharpener comprising: a relatively flat frame plate; a forward edge on said frame plate adapted to align with the axis of said saw; a straight side edge on said frame plate at an acute angle to said forward edge; flange plates secured on the upper and lower faces of said frame plate in alignment with said forward edge and adapted to contact the near side of said saw; a spacing tongue extending forwardly from said frame plate and adapted to pass over said saw; a backing plate carried by said tongue positioned to engage the far side of said saw; a shaft sleeve; means supporting said sleeve along and in alignment with said straight edge; an abrasive-supporting shaft rotatably mounted in said sleeve; an abrasive rod supported at the forward extremity of said shaft; means for rotating said shaft; and a hand grip device pivotally mounted on said frame plate at the side opposite said straight edge and having means for communicating the movements of said hand grip device to said shaft for reciprocating the latter.

2. A chain saw sharpener as described in claim 1 in which the means for communicating the movements of said hand grip device comprises a cam plate pivotally mounted on said frame plate in the path of said hand grip member so as to be contacted and rotated by said member; a connecting bar extending from said cam plate to a rotatable connection with said shaft so that the rotative movements of said cam plate will transmit longitudinal movement to said shaft; and spring means urging said shaft longitudinally in one direction.

3. A chain saw sharpener comprising: a relatively flat frame plate; a forward edge on said frame plate adapted to align with the axis of said saw; a straight side edge on said frame plate at an acute angle to said forward edge; flange plates secured on the upper and lower faces of said frame plate in alignment with said forward edge and adapted to contact the near side of said saw; a spacing tongue extending forwardly from said frame plate and adapted to pass over said saw; a backing plate carried by said tongue positioned to engage the far side of said saw; a shaft sleeve; parallel, longitudinally-extending fins formed on said sleeve passing above and below said frame plate to align said sleeve in the plane of said plate; pivot means securing said fins to said frame plate adjacent the rear extremity of said sleeve, so that said sleeve may be swung toward and away from said frame plate; an abrasive-supporting shaft rotatably and slidably mounted in said sleeve, so that by gripping said frame plate and said sleeve in the hand, said abrasive-supporting shaft will be swung toward said frame plate; a hand grip member pivotally mounted on said frame plate on the side opposite said straight edge; spring means urging said hand grip member outwardly from said frame plate; and means for transmitting the movements of said hand grip member to said shaft for longitudinally reciprocating the latter.

4. A chain saw sharpener as described in claim 3 having a bracket device secured on said frame plate at the rear extremity thereof; a tubular sleeve supported by said bracket device; a longitudinally slotted stub shaft rotatably mounted in said sleeve; a flattened extremity formed on said shaft and engaging in the slot of said stub shaft so that rotation of said stub shaft will be transmitted to said abrasive-supporting shaft and so that said two shafts may move longitudinally relatively to each other.

References Cited in the file of this patent
UNITED STATES PATENTS

| 1,111,191 | Steckel | Sept. 22, 1914 |
| 1,488,056 | Orr | Mar. 25, 1924 |
| 2,568,062 | Fitch | Sept. 18, 1951 |
| 2,643,553 | Evanoff | June 30, 1953 |